April 25, 1967

V. T. ABEL ET AL 3,316,013

FOLDING SEAT CONSTRUCTION

Filed Aug. 13, 1965

INVENTORS
Vernon T. Abel,
Theodore C. Thomas
BY Stevens, Davis, Miller & Mosher
ATTORNEYS April 25, 1967 V. T. ABEL ET AL 3,316,013
FOLDING SEAT CONSTRUCTION
Filed Aug. 13, 1965 5 Sheets-Sheet 2

INVENTORS
Vernon T. Abel,
Theodore C. Thomas
BY Stevens, Davis, Miller & Mosher
ATTORNEYS

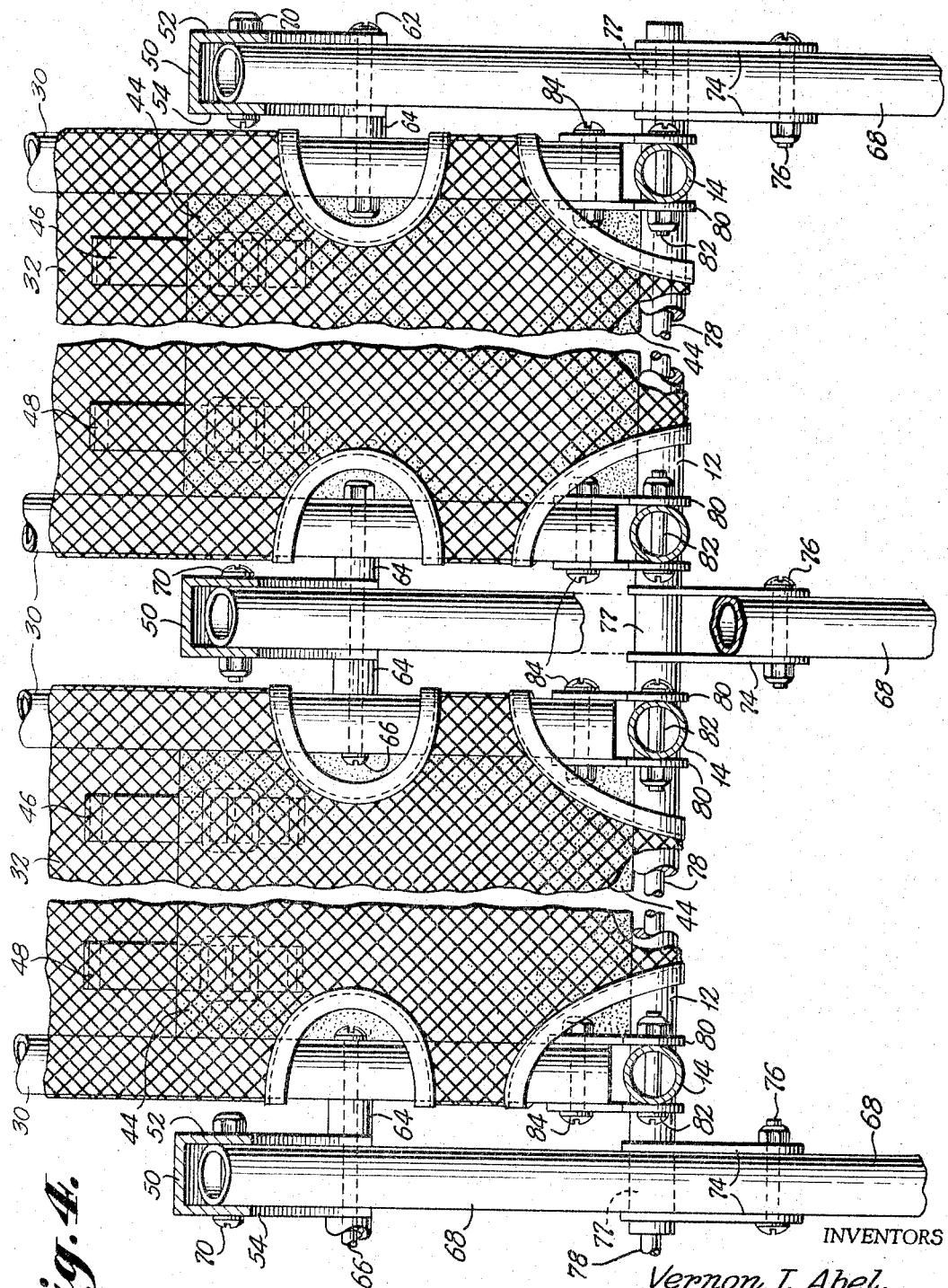

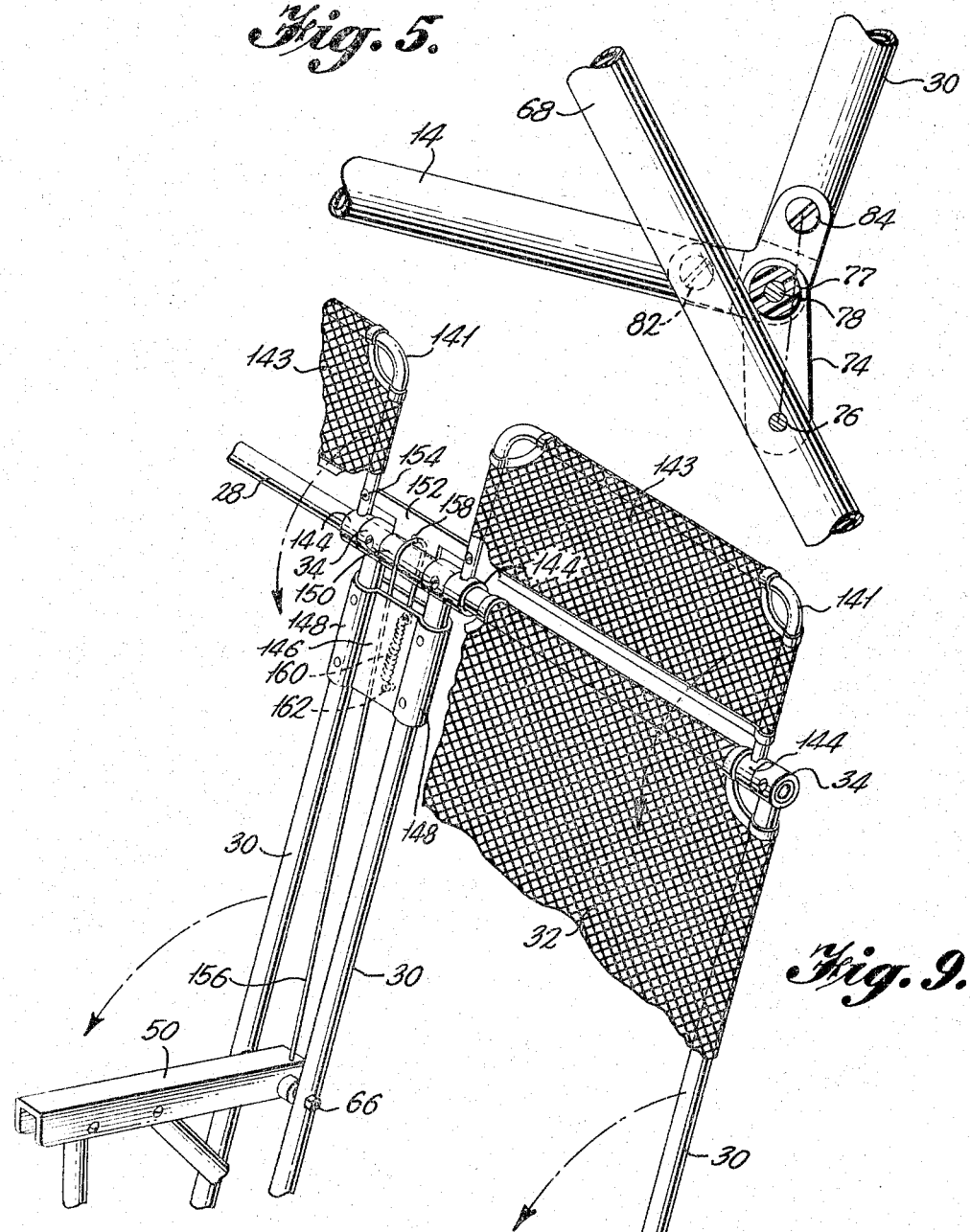

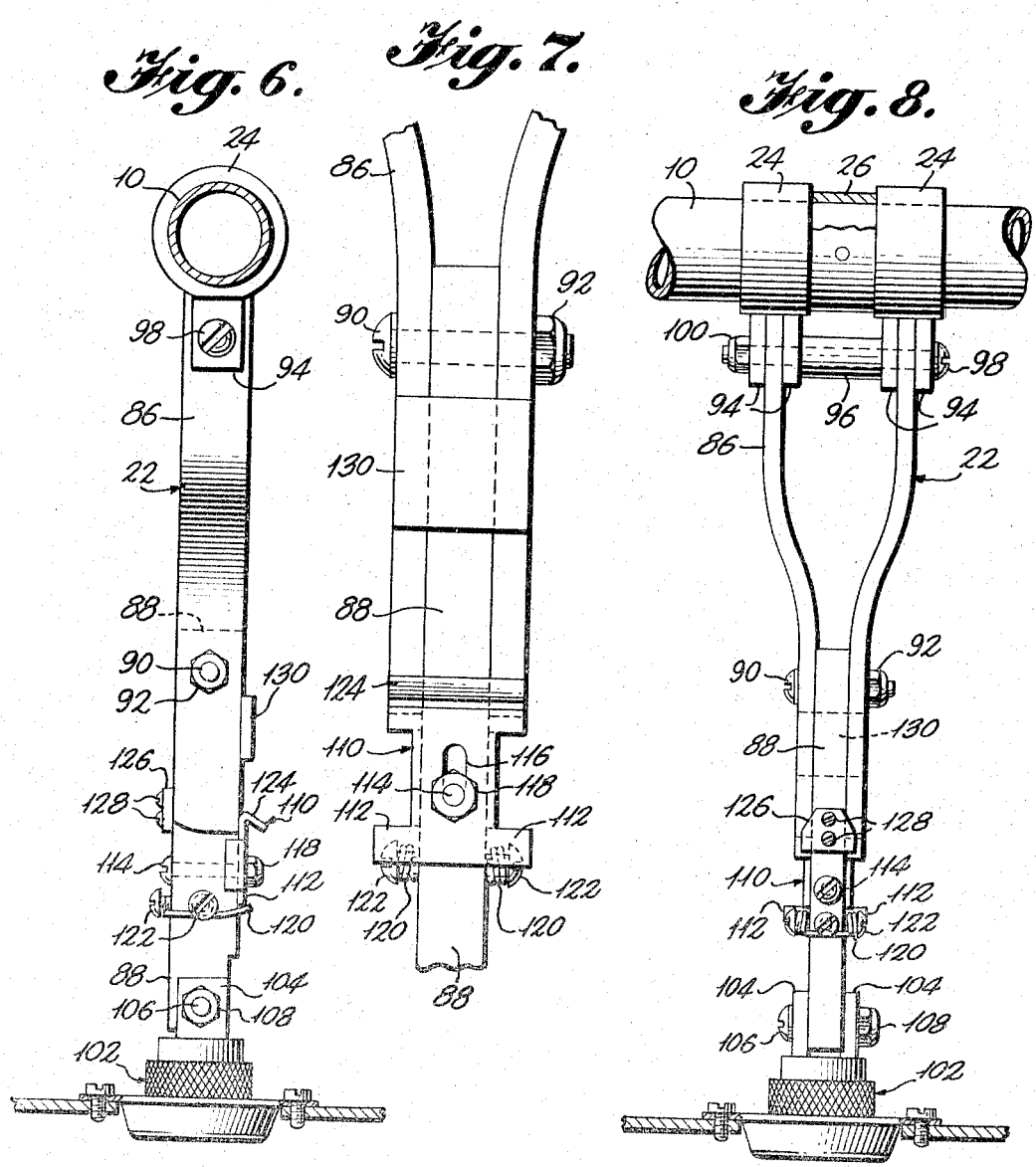

United States Patent Office 3,316,013
Patented Apr. 25, 1967

3,316,013
FOLDING SEAT CONSTRUCTION
Vernon T. Abel and Theodore C. Thomas, both of Ellicott City, Md., assignors to C. R. Daniels, Inc., a corporation of New York
Filed Aug. 13, 1965, Ser. No. 479,549
14 Claims. (Cl. 297—16)

The present invention relates to a folding seat construction, and more particularly to such structures possessing such strength in proportion to their weight as to render them especially suitable for use in vehicles such as troop transport aircraft.

It is known to employ folding seat constructions in such aircraft, however, the prior art constructions have in general been designed to be folded upwardly to a stowed position adjacent the sidewalls of the fuselage. In such known arrangements, the seat constructions could be arranged only along each side of the fuselage.

In accordance with the present invention, there is provided a folding seat construction which is folded downwardly into a compact unit lying on the floor of the vehicle and having a height of only a few inches. The folded seats may be readily removed to convert the vehicle from passenger to freight service.

It is a primary object of the present invention to provide a strong, lightweight, folding seat construction which in the open position is comfortable and will safely accommodate one or more passengers, and which can be readily folded to a compact stowed position adjacent the floor of the vehicle.

Another object of the present invention is to provide a folding seat construction which may be readily removed from the airplane or other normal place of installation.

A further object of the present invention is to provide a comfortable folding seat structure designed for occupancy by a plurality of passengers in which each passenger is provided with individual seat and back rest portions to facilitate the individual passenger's comfort even on long trips.

Still another object of the present invention is to provide a folding seat construction having novel individual head rests.

The above and other objects, features and advantages of the present invention will become more apparent upon consideration of the present disclosure in its entirety.

In the drawings:

FIGURE 4 is a partial vertical cross sectional view taken on the line 4—4 of FIGURE 2;

FIGURE 5 is a fragmentary side elevational view illustrating the details of linkage means interconnecting a rear leg to portions of the seat and back rest support members;

FIGURE 6 is a view partly in section and partly in side elevation showing the construction of a front leg on an enlarged scale;

FIGURE 7 is a fragmentary rear view on an enlarged scale of the front leg of FIGURE 6;

FIGURE 8 is a front view of the leg of FIGURE 6; and

FIGURE 9 is a partial perspective view of another embodiment of the present invention having folding head rests.

Figure 1:
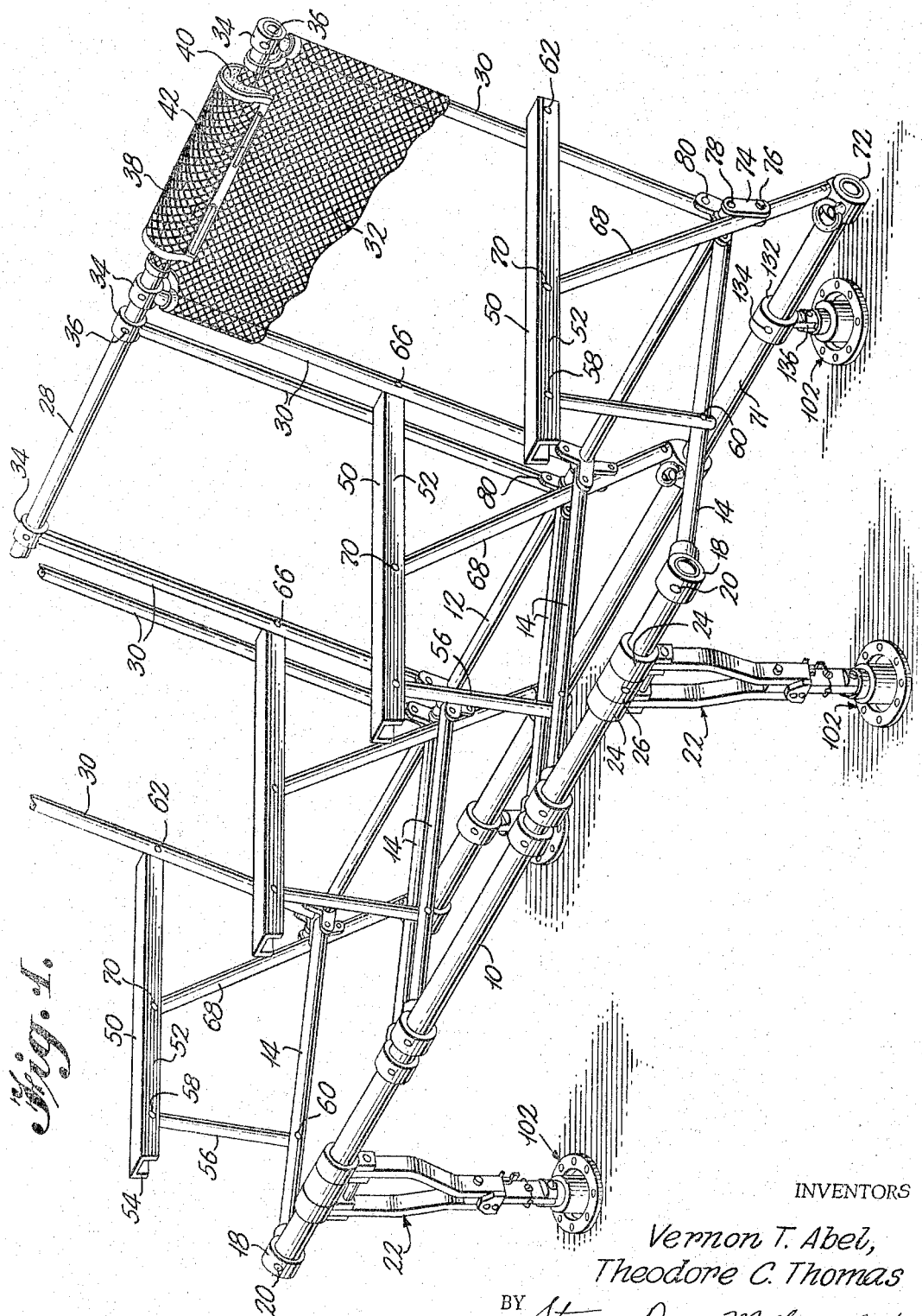
FIGURE 1 is a perspective view of a triple occupancy seat incorporating the present invention, with portions thereof broken away.
Figure 3:
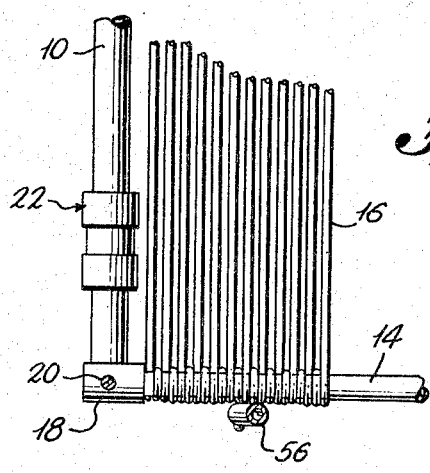
FIGURE 3 is a fragmentary top view showing details of the cording used to provide a resilient seat portion.

Referring now to the drawings wherein like reference numerals designate like parts throughout the several views, and more particularly to FIGURE 1; there is disclosed a folding seat construction fabricated of hollow tubular metallic elements except for the arm rests, front legs, linkages, and fixtures securing the seat construction to the floor. The illustrated embodiment, which is adapted for occupancy by three passengers, includes a seat framework consisting of a front support rail 10, a rear support rail 12, and six side support members 14, each pair of which define the sides of an individual seat. Each seat portion is composed of a suitable resilient material, preferably of a plurality of closely adjacent runs of a plastic covered cord 16 (FIG. 3) extending between the side support members 14. The side support members are rigidly connected to the front support rail 10 by essentially T-shaped couplings 18 and suitable fastening means such as bolts 20.

Collapsible front legs generally designated by reference numeral 22 are pivotally connected to the front support rail 10 by means of sleeves 24 on opposite sides of a fixed ring member 26 which may be bolted or otherwise suitably secured to the front support rail. The construction of the collapsible front legs will be described in detail hereinafter.

The rear support rail 12 in conjunction with an upper cross bar 28 and six side frame portions 30 define a framework for three individual back rests 32 which are preferably formed of nylon or other suitable washable material. The side frame portions 30 have at their upper ends annular couplings 34 which are secured to cross bar 28 by bolts 36. Preferably, removable head rests consisting of an outer fabric cover 38 and an inner resilient core 40 of foam rubber or like material, are fastened around the upper crossbar by draw strings 42 extending through apertures provided in back rest 32, or by other suitable means.

Figure 2:
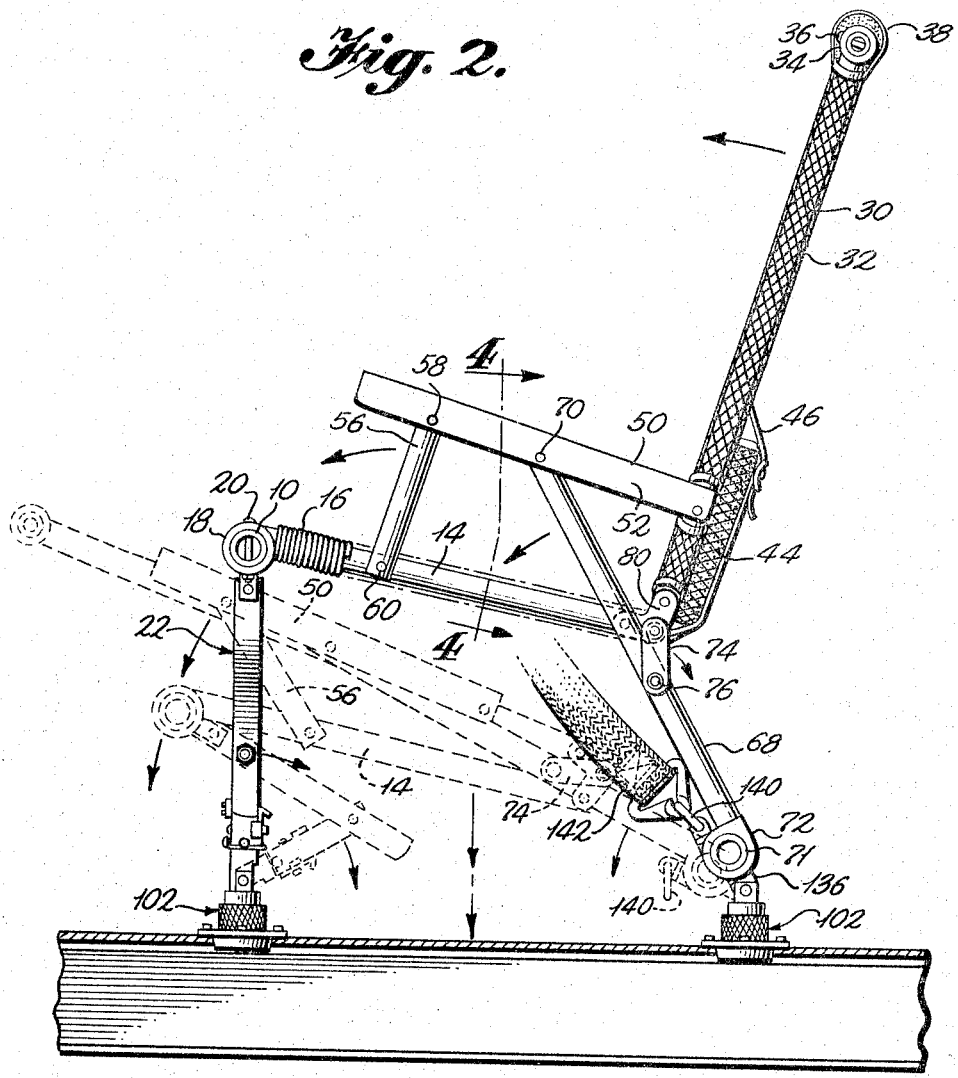
FIGURE 2 is a side elevational view of same fragmentarily showing a seat belt secured thereto, and by dash lines illustrating the seat in a partially folded position.

As shown in FIGURE 2, a kidney pad 44 consisting of a foam rubber core and a fabric covering may be detachably secured to the lower rear surface of back rests 32, for example, by straps 46, 48 which may be buckled together.

On both sides of each seat, there are provided arm rests of an essentially inverted U-shaped cross section consisting of a flat upper surface 50 and two depending flanges 52, 54. An arm rest support 56 is pivotally connected adjacent the front end of each arm rest by a bolt 58 passing through flanges 52, 54. Each arm rest support is pivotally connected at its other end by a bolt 60 to a side support member 14. The other end of the two outermost arm rests are pivotally connected to the outermost side frame portions 30 of the back rest via bolt and lock nut assemblies 62 and spacer rings 64 as is best seen in FIGURE 4. The two inner arm rests are similarly each pivotally connected to corresponding side frame portions 30 on each side thereof via a bolt and lock nut assembly 66 which is similar to but of longer length than the bolt and lock assemblies 62 mentioned above. In this case, two spacer sleeves 64 are provided as clearly shown in FIGURE 4.

A rear leg 68 is pivotally connected at its upper end to the middle portion of each arm rest by a bolt 70 extending through flanges 52, 54 and a cooperating lock nut. The bottom end of each rear leg is rigidly connected to a transverse frame member 71 via a coupling 72.

Rear legs 68 are adapted for downward counter-clockwise pivotal movement in conjunction with similar movement by the seat and back rest frame members by way of linkage mechanisms which will now be described. A pair of links 74 are disposed on opposite sides of each rear leg 68 and pivotally secured thereto by a bolt and nut assembly 76 as is best seen in FIGURE 4. Between the other ends of links 74 there is provided an annular stop 77 of nylon or similar somewhat resilient material.

An elongated bolt member 78 passes through the aperture in annular stop 77, corresponding apertures in the abutting links 74, apertures in hinge links 80, and through the tubular rear support rail 12 of each of the three individual seats. Thus, the elongated bolt member 78 extends the entire width of the illustrated seat construction, and is suitably fastened by a lock nut at the other end thereof.

The hinge links 80, which are provided in pairs, are pivotally connected at opposite ends thereof to side support members 14 and to side frame portions 30 by bolt and nut assemblies 82, 84, respectively. In this manner, when the back rest assembly is pivoted forwardly, the side frame portions 30 substantially overlie and abut the side support members 14 of the seat.

In the erected position of the seat construction, stop 77 is pressed firmly against the rear surface of rear legs 68 by the weight of the occupants, and inadvertent folding of the seat construction is prevented.

Referring now to FIGURES 6 through 8, each collapsible front leg 22 consists of an upper fork-shaped portion 86 constituted by a pair of spaced metal bars, and a lower portion having an extension 88 normally positioned between the spaced lower ends of fork portion 86 by means of a bolt 90 and nut 92 which pivotally connect the two portions of the front legs. As seen in FIG. 8, the upper ends of bars 86 are connected to annular sleeves 24 by means of pairs of depending apertured lugs 94, an annular spacer bar 96, a bolt 98, and the associated nut 100. It will be noted that the annular sleeves 24 may rotate with respect to front support rail 10. The lower end of extension 88 is pivotally connected to a suitable floor fixture generally designated by reference numeral 102 which may be of any suitable construction, and which is preferably readily removable from the floor when desired. Fixture 102 includes a pair of spaced vertical lugs 104 which are pivotally connected to the lower end of member 88 by a bolt 106 and nut 108.

The upper and lower portions of front legs 22 are normally prevented from collapsing to the dash line position shown in FIG. 2 by a locking member 110 which in the locking position thereof extends above the lowermost edges of bars 86 as shown in FIG. 6. The locking member has a pair of opposed flanges 112 which extend on either side of member 88. A bolt 114 extending through member 88 and through an elongated slot 116 provided in the locking member, and in the associated nut 118 fasten the locking member in position while allowing for vertical reciprocation thereof. A spring 120, which is held in position by a plurality of screws 122, abuts against the bottom surface of locking member 110 to normally bias it into its upper or locking position. The locking member has a downwardly bent finger portion 124 by means of which the locking member may be pressed downwardly into the inoperative position when it is desired to collapse the front legs in the process of folding the seat construction into its stowage position. Finger portion also functions as a cam surface when the seat is moved towards its erected operative position.

A front abutment 126, which is secured to member 88 by screws 128, and a rear abutment 130 which is welded or otherwise suitably secured to bars 86, prevent undesired relative movement of the leg parts, for example, collapse of the leg portions outwardly rather than inwardly as viewed in FIG. 2.

As shown in FIGS. 1 and 2, the transverse frame member 71 may be connected to suitable fixtures 102 corresponding to those described previously in connection with the front legs by means of annular couplings 132 which are bolted to the transverse frame member by bolts 134. Couplings 132 are provided with downwardly depending lugs 136 which are pivotally connected to the fixtures 102.

As shown in FIG. 2 rings 140 connected to couplings 72 may be utilized as connections for seat belts 142. In this manner, any forces, which may be transmitted to the seat belts by an occupant being thrust thereagainst, are transmitted to a point only slightly above the floor. This results in an advantageous dissipation of the forces and does not impair the stability of the seat construction as would be the case if the seat belts were anchored at a higher position.

FIG. 9 illustrates another embodiment of the present invention. This embodiment is identical to that described previously with the exception that it includes a folding head rest which may be folded forwardly and downwardly in the direction of the arrows shown in FIG. 9 when the seat construction is to be stowed. The folding head rest includes an essentially U-shaped tubular support frame 141 and a flexible fabric head support portion 143 made of nylon or similar material. Annular sleeves 144 are integrally connected to the lower ends of each U-shaped frame 141, and are rotatably mounted on cross bar 28. Between each pair of seats there is provided an open ended casing 146 made of sheet metal or the like which has at each side thereof enlarged arcuate portions 148 which are suitably secured to the back rest side frame portions 30 of the two adjacent seat assemblies. Also rotatably mounted on cross bar 28 is an annular sleeve 150 having integral therewith a T-shaped member 152 having its two arm portions secured by bolts 154 or other suitable means to the frames 141 of the two adjacent head rests. A cable 156 is secured at one end to the flat upper surface 50 of the arm rest at a point rearwardly of the axis of bolt 66, for example, by being passed through an aperture in surface 50 and knotted at the under side thereof. The cable extends upwardly between side frame portions 30, through casing 146, through an aperture 158 provided in T-shaped member 152, and downwardly again into casing 146 where it is connected to one end of a spring 160. The other end of the spring is secured to a fixed pin 162. The cable may be provided with knots or other enlargements on opposite sides of and essentially abutting the T-shaped member 152 to fix this portion of the cable relative to the T-shaped member. As is evident, spring 160 is designed to normally bias the T-shaped member 152 and the head rests into the upper position illustrated in FIG. 9. When the seat construction of this embodiment is moved towards the folded position, the head rest will automatically swing downwardly in the direction of the arrows to lie against the front surface of back rest 32 since, with the cable secured rearwardly of bolt 66 which is the pivot point for the arm rest relative to the back rest, such motion pulls cable 156 downwardly. The movement of the cable which is attached to the member 152, swings this member and the head rests which are connected thereto arcuately downwardly in the direction shown by the arrows in FIG. 9. This arcuate movement of the head rests is completed during the initial stages of the collapse of the seat construction.

The operations of folding and erecting seat constructions in accordance with the present invention is believed to be readily apparent from the foregoing description. For example, it is apparent that to fold the seat construction into its storage position, the locking member 110 is depressed by the finger piece 124. Thereafter, the entire seat construction may be folded to a storage position against the floor occupying a total height of only a few inches. It should also be noted that the seat, back rest, arm rest and rear legs may all be moved arcuately downwardly to a partially collapsed position without initially depressing locking member 110 to allow for collapse of the front legs. In fact, this is considered an important feature of the present invention since a partially collapsed position may be used to advantage when personnel are entering or departing from a vehicle.

From the foregoing description, it is apparent that seat constructions in accordance with the present invention are extremely light weight, and yet are capable of sustaining high loading. For example, a preferred embodiment of the present invention designed for triple occupancy having an overall length of about 58 inches and a weight of about 31½ pounds is capable of withstanding a forward seat belt load in excess of 9½ G's, a downward load of 6½ G's, a side load of 3 G's, and a rearward load of 2 G's. This embodiment in its folded storage position has a depth of less than about 32 inches, and a height of approximately 4½ inches.

Although presently preferred embodiments of the present invention have been shown and described herein, it will be understood that the invention is susceptible of many changes and modifications which will suggest themselves to those skilled in the art without departing from the scope and spirit of the invention. For example, the arm rests may be provided with means for supporting thereon such items as food trays, ash trays, etc. It is intended to encompass all such changes and modifications as fall within the scope and purview of the appended claims.

What is claimed is:

1. A folding seat construction comprising at least one seat portion, front support rail means, rear support rail means, a plurality of side support members extending between said front and rear support rail means and cooperating therewith to form a framework, at least one back rest pivotally connected to said side support members, a plurality of arm rests pivotally connected at the rear end thereof to said back rest, a rear transverse frame member, a plurality of rear legs each pivotally connected at the upper end thereof to an arm rest and rigidly connected at the lower end to said rear transverse frame member, connector means engaging said transverse frame member to secure said transverse frame member to a supporting surface, a plurality of collapsible front legs pivotally connected to said front support rail means, each of said front legs including an upper portion and a lower portion essentially aligned with each other in the erected position of the seat construction, connector means adapted to connect the bottom end of said lower portions of said front legs to a supporting surface, and locking means in one position thereof preventing collapse of said front legs.

2. A folding seat construction according to claim 1, wherein said seat construction in the folded position thereof has a height of approximately four and a half inches.

3. A folding seat construction according to claim 1, further comprising a head rest secured to said back rest.

4. A folding seat construction according to claim 3 wherein said head rest includes a resilient core portion detachably connected to the upper end of said head rest.

5. A folding seat construction according to claim 3 wherein said head rest is pivotally connected to said back rest.

6. A folding seat construction according to claim 3, further comprising cable means connecting said head rest with an arm rest so that, upon pivotal movement of said back rest towards said arm rest, said head rest is pivoted downwardly against the front of said back rest, and spring means connected to said cable means to bias said head rest upwardly in the erected position of said seat construction.

7. In combination with the floor of a vehicle, a folding seat construction comprising a plurality of interconnected individual seat portions, front support rail means, rear support rail means, a plurality of side support members extending between said front and rear support rail means and cooperating therewith to form a framework for the individual seat portions, a plurality of individual back rests pivotally connected to said support members, a plurality of arm rests pivotally connected at the rear end thereof to said back rests, a plurality of rear legs each pivotally connected at the upper end thereof to an arm rest, rear fixture means secured to said floor, means pivotally connecting said rear legs to said rear fixture means, a plurality of collapsible front legs having pivotally interconnected upper and lower portions, said upper portions being pivotally connected to said front support rail means, front fixture means secured to said floor, means pivotally connecting the bottom end of said lower portions to said front fixture means, and locking means in one position thereof preventing collapse of said front legs.

8. A multiple occupancy folding seat construction comprising a plurality of interconnected individual seat portions, front support rail means, rear support rail means, a plurality of side support members extending between said front and rear support rail means and cooperating therewith to form a framework of the individual seat portions, a plurality of interconnected individual back rests pivotally connected to said side support members, a plurality of arm rests pivotally connected at the rear end thereof to said back rests, arm rest support members pivotally connected at one end to the front end of said arm rests and at the other end pivotally connected to the respective side support member, rear transverse frame means, a plurality of rear legs each pivotally connected at the upper end thereof to an arm rest and connected at the lower end to said rear transverse frame means, connector means to pivotally secure said transverse frame means to a supporting surface, a plurality of collapsible front legs having pivotally interconnected upper and lower portions, said upper portions being pivotally connected to said front support rail means, connector means pivotally connected to the bottom end of said lower portions and adapted to be connected to a supporting surface, and locking means in one position thereof preventing pivotal movement of the upper and lower portions of said front legs with respect to each other.

9. A folding seat construction according to claim 8, wherein said collapsible front legs include an upper fork-shaped portion formed by a pair of spaced bars and a lower portion having an extension positioned between the lower ends of said spaced bars and pivotally secured thereto, and wherein said locking means include a member mounted on said extension and adapted to reciprocate vertically, and spring means normally biasing said member into the locking position thereof.

10. A folding seat construction according to claim 8, further comprising hinge links forming the pivotal connection between said back rest and said side support members, additional link means pivotally connected to said hinge links and to said rear legs, and stop means operatively connected to said link means and positioned to abut against the adjacent rear surface of said rear legs in the erected operative position of the seat construction.

11. A folding seat construction according to claim 8 wherein each arm rest includes a substantially flat upper surface and a pair of depending flanges, and wherein said arm rest support members and the upper ends of said rear legs are each pivotally connected to said flanges.

12. A folding seat construction according to claim 8 wherein said back rests include upper cross bar means, and further comprising head rests pivotally connected to said cross bar means and in the operative position thereof extending above said back rests, and means to automatically pivot said head rests forwardly and downwardly against said back rests upon forward pivotal movement of said back rest toward the folded position of the seat construction.

13. A folding seat construction comprising at least one seat portion, front support rail means, rear support rail means, a plurality of side support members extending between said front and rear support rail means and cooperating therewith to form a framework, at least one back rest pivotally connected to said side support members, a plurality of arm rests pivotally connected at the rear end thereof to said back rest, a rear transverse frame member, a plurality of rear legs each pivotally connected at the upper end thereof to an arm rest and connected at the lower end to said rear transverse frame member, connector means to secure said transverse frame member to a supporting surface, a plurality of collapsible front legs pivotally connected to said front support rail means, each of said front legs including an upper fork-shaped portion formed by a pair of spaced bars and a lower portion having an extension positioned between the lower ends of said spaced bars and pivotally secured thereto, and locking means to prevent collapse of said front legs, said locking means including a member mounted on said extension and adapted to reciprocate vertically and spring means normally biasing said member into the locking position thereof.

14. In a folding seat construction having a framework including a plurality of side support members, at least one seat portion, at least one back rest pivotally connected to said side support members, at least one arm rest pivotally connected at the rear end thereof to said back rest, and a head rest pivotally connected to said back rest, the improvement comprising a cable connected to said head rest and to said arm rest and positioned so that, upon pivotal movement of said back rest towards said arm rest, said head rest is pivoted downwardly against the front of said back rest, and spring means connected to said cable means to bias said head rest upwardly in the erected position of said seat construction.

References Cited by the Examiner

UNITED STATES PATENTS

| | | | |
|---|---|---|---|
| 337,521 | 3/1886 | Scarritt | 297—61 |
| 379,066 | 3/1888 | Harwood | 297—41 |
| 653,378 | 7/1900 | Curry | 297—32 |
| 916,379 | 3/1909 | Kalitzky | 297—61 |
| 1,683,327 | 9/1928 | Bouharoun | 297—48 |
| 2,556,076 | 6/1951 | Evans et al. | 297—16 |
| 2,567,111 | 9/1951 | Jensen | 297—47 |
| 2,638,151 | 5/1953 | Jones | 297—359 |
| 3,043,626 | 7/1962 | Requa | 297—397 |
| 3,047,333 | 7/1962 | Stanimir | 297—35 X |
| 3,114,572 | 12/1963 | Hopkins | 297—39 |
| 3,145,051 | 8/1964 | Rausch | 297—115 |

FRANK B. SHERRY, *Primary Examiner.*

FRANCIS K. ZUGEL, *Examiner.*